United States Patent [19]

Hofmann

[11] Patent Number: 4,657,227
[45] Date of Patent: Apr. 14, 1987

[54] TWO-CHAMBER ENGINE MOUNT WITH HYDRAULIC DAMPING

[75] Inventor: Manfred Hofmann, Hünfelden, Fed. Rep. of Germany

[73] Assignee: Metzeler Kautschuk GmbH, Munich, Fed. Rep. of Germany

[21] Appl. No.: 799,541

[22] Filed: Nov. 8, 1985

Related U.S. Application Data

[63] Continuation of Ser. No. 556,635, Nov. 30, 1983, abandoned.

[30] Foreign Application Priority Data

Nov. 30, 1982 [DE] Fed. Rep. of Germany ....... 3244296

[51] Int. Cl.⁴ .............................................. F16F 9/08
[52] U.S. Cl. ..................... 267/8 R; 267/35; 267/140.1
[58] Field of Search ............ 267/8 R, 35, 63 R, 63 A, 267/64.23, 64.27, 113, 140.1, 140.2, 140.3, 141, 141.3, 141.4, 141.5, 141.6, 141.7, 152; 188/378, 379, 380; 248/562, 565, 566, 636

[56] References Cited

U.S. PATENT DOCUMENTS 4,418,897 12/1983 Härtel et al. ..................... 267/140.1

FOREIGN PATENT DOCUMENTS

| 2948408 | 6/1981 | Fed. Rep. of Germany ...... 267/152 |
| 57-173633 | 10/1982 | Japan ................................... 267/141 |
| 58-196341 | 11/1983 | Japan ................................... 267/140.1 |
| 2041488 | 9/1980 | United Kingdom .............. 267/8 R |
| 2068079 | 8/1981 | United Kingdom ............. 267/140.1 |
| 580384 | 11/1977 | U.S.S.R. ........................... 267/140.1 |

Primary Examiner—George E. A. Halvosa
Assistant Examiner—Richard R. Diefendorf
Attorney, Agent, or Firm—Herbert L. Lerner; Laurence A. Greenberg

[57] ABSTRACT

A two-chamber engine mount with hydraulic damping, includes a housing, an intermediate plate disposed in the housing dividing the housing into an upper chamber above the intermediate plate and a lower chamber below the intermediate plate to be filled with fluid, the intermediate plate having a damping opening formed therein for fluid passage, an upper rubbery elastic peripheral wall at least partially defining the upper chamber, a lower cup-shaped rubbery elastic peripheral wall with a given hardness at least partially defining the lower chamber, an upper motor support plate disposed above the upper chamber, the upper support plate having a membrane chamber centrally formed therein to be filled with air, and a rubbery membrane having a greater hardness than the given hardness separating the membrane chamber from the upper chamber.

5 Claims, 6 Drawing Figures

TWO-CHAMBER ENGINE MOUNT WITH HYDRAULIC DAMPING

This application is a continuation of application Ser. No. 556,635, filed Nov. 30, 1983, now abandoned.

The invention relates to a two-chamber engine mount with hydraulic damping, especially for motor vehicles, with fluid-filled chambers having rubber-elastic peripheral walls interconnected through an intermediate plate having a throttling or damping opening formed therein, and an additional air-filled chamber separated from the upper chamber by a membrane.

An engine mount of this type is known from German Published, Non-Prosecuted Application DE-OS No. 30 27 742. This motor mount which has an elastically-supported intermediate plate and a valve which closes automatically at high pressure, includes the feature that it does not respond hydraulically to high frequency vibrations with small amplitudes, and that such vibrations are only slightly damped, while in the case of vibrations of lower frequencies and increasing amplitudes, increased damping occurs by means of an increased fluid exchange. Furthermore, the elastic support of the intermediate plate provides a hydraulic decoupling or neutralizing of low amplitudes to a small degree up to a frequency range of about 200 Hz, thereby enhancing the acoustic behavior.

Another device for providing a hydraulic decoupling or neutralizing is disclosed in German Published, Non-Prosecuted Application DE-OS No. 26 18 333, wherein an annular space is provided in a cover cap at the motor side in vicinity of the outer periphery, which is separated from the fluid chamber by a membrane. However, the hydraulic neutralization obtained in this way is only at high frequencies of about 1000 Hz, and therefore has practically no effect for the range of up to maximally 400 Hz, which is actually of interest.

The most important requirements for an optimal engine mount are the absorption of starting and braking moments, the absorption of forces introduced by uneven conditions of the road, the avoidance of freewheeling vibrations, as well as good insulation from sound conducted through the body. This amounts to a requirement that the engine mount has either high stiffness or high damping, which is a requirement having an acoustically negative effect on the isolation of the dynamic mass forces of the motor, since a soft support is required for a good isolation of body noise.

It is accordingly an object of the invention to provide a two-chamber engine mount with hydraulic damping, which overcomes the hereinafore-mentioned disadvantages of the heretofore-known devices of this general type, which is constructed in such a way that high damping occurs with large vibration amplitudes, and that an optimal isolation of the acoustic behavior as well as of the induced vibrations is assured especially at low amplitudes.

With the foregoing and other objects in view there is provided, in accordance with the invention, a two-chamber engine mount with hydraulic damping, especially for motor vehicles, comprising a housing, an intermediate plate disposed in the housing dividing the housing into an upper chamber above the intermediate plate and a lower chamber below the intermediate plate to be filled with fluid, the intermediate plate having a damping or throttling opening formed therein for fluid passage, an upper rubbery elastic peripheral wall at least partially defining the upper chamber, a lower cup-shaped rubbery elastic peripheral wall with a given hardness at least partially defining the lower chamber, an upper motor support plate disposed above the upper chamber, the upper support plate having a membrane chamber centrally formed therein to be filled with air, and a rubbery membrane having a greater hardness than the given hardness separating the membrane chamber from the upper chamber.

The use of this construction enables the lower chamber to offer only a small resistance to the fluid flowing in through the throttling orifice at greater amplitudes of a lower frequency and thus assures a rapid fluid exchange and high damping, while at low amplitudes of high frequency, the fluid exchange is greatly reduced due to the response of the membrane, thereby assuring an optimal acoustic isolation.

In accordance with another feature of the invention, the upper support plate has a ventilating hole formed therein providing communication between the membrane chamber and the surroundings.

In accordance with a further feature of the invention, the membrane chamber is closed off from the surroundings.

In accordance with an added feature of the invention, the pressure in the membrane chamber is adjustable.

In accordance with an additional feature of the invention, the diameter of the membrane is substantially between one-quarter and one-third the size of the largest diameter of the upper chamber.

In accordance with a concomitant feature of the invention, the given hardness of the lower wall is a Shore-A- hardness substantially between 10 and 50, and especially between 30 and 40.

Other features which are considered as characteristic for the invention are set forth in the appended claims.

Although the invention is illustrated and described herein as embodied in a two-chamber engine mount with hydraulic damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
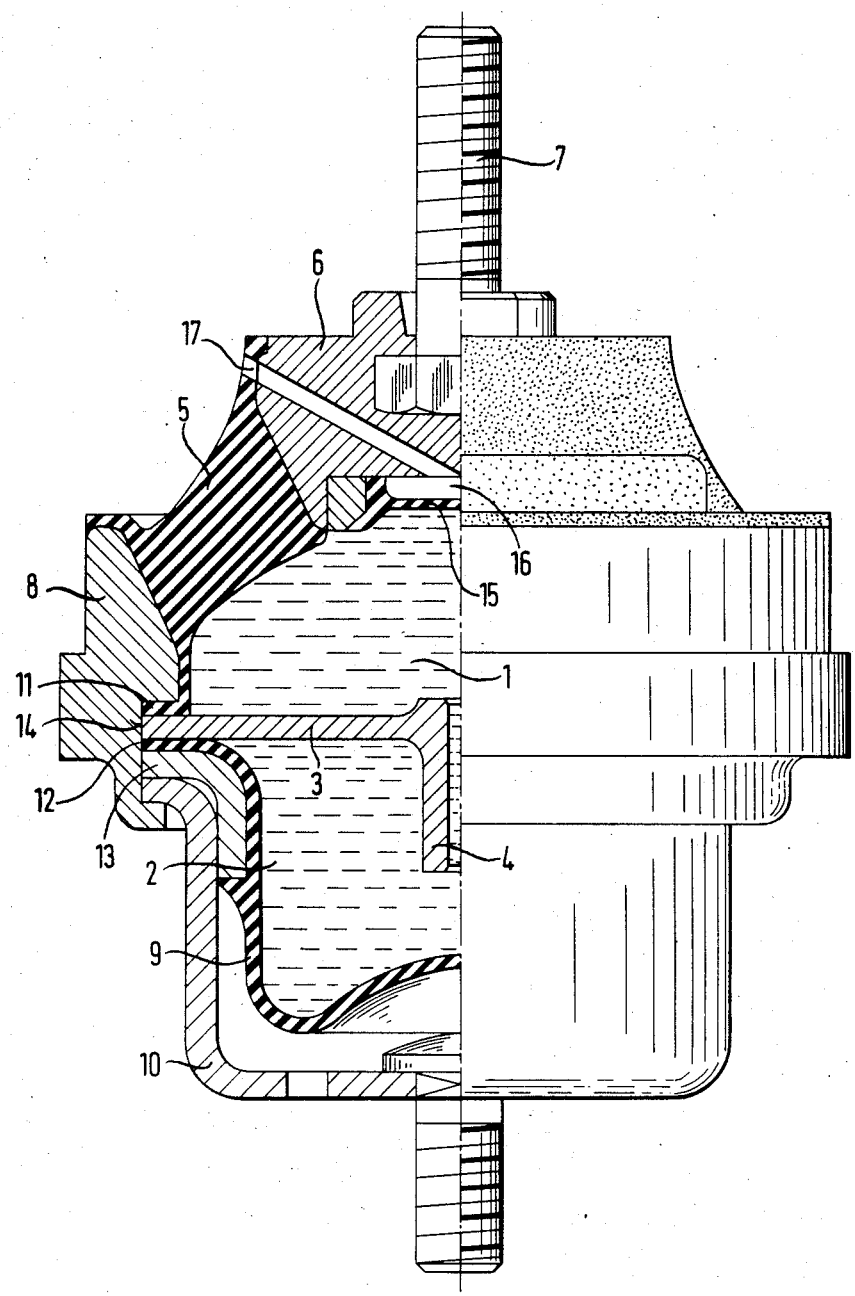
FIG. 1 is a diagrammatic sectional view of a two-chamber engine mount.

Referring now to the figures of the drawings in detail and first particularly to FIG. 1 thereof, there is seen an engine mount which is essentially formed of an upper fluid chamber 1 and a lower fluid chamber 2, which are separated from each other by a rigid intermediate plate 3 with a nozzle-shaped throttle or damper 4. The upper chamber 1 is formed by a thick chamber wall 5 in the shape of a hollow cone, and is made of elastic rubber material. The hollow cone is closed at the top thereof by a motor support plate 6 with a mounting bolt 7, and is permanently connected to a thrust member 8 at the lower end thereof. The lower chamber 2 is formed by a substantially cup-shaped chamber wall 9 made of an elastic rubber material of relatively low hardness, which additionally is surrounded by a solid protective cap 10. The intermediate plate 3 is clamped and rigidly held between an outwardly bent lower rim 11 of the upper chamber wall 5 above, and a rim 12 of the lower chamber wall 9 as well as an additional clamping ring 13 below, which are disposed in an annular inner groove 14 formed in the thrust member 8.

Figure 1A:
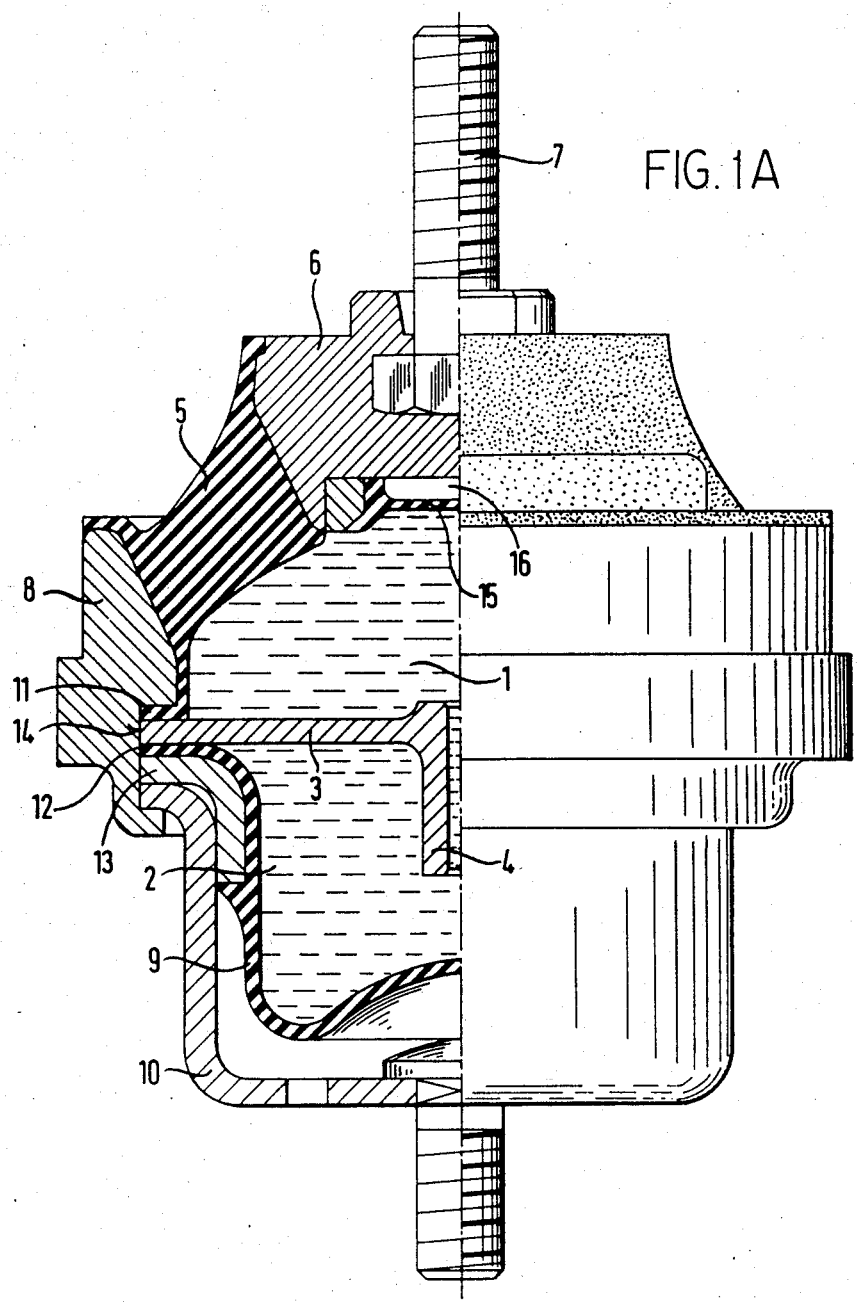
FIG. 1A is a view like that of FIG. 1 of another embodiment of the two-chamber engine mount.

According to the invention, a membrane chamber 16 which is separated from the chamber 1 by a disc-shaped rubber membrane 15, is provided at the lower surface of the motor support plate 6. The membrane chamber 16 in the embodiment shown is in communication with the outer atmosphere by means of a channel 17. However, the chamber 16 may be closed off from the surroundings, as shown in FIG. 1A.

In the case of high vibration amplitudes, occuring generally at low frequencies, a fluid exchange between the upper chamber 1 and the lower chamber 2 takes place. The lower chamber only has a very low resistance with respect to the inflow of fluid from the upper chamber 1 due to the low hardness of the chamber wall 9, which generally is made of a rubber with a Shore-A-hardness of 10 to 50, especially a hardness of 30 to 40. Consequently, high amplitudes of the motor are very strongly damped. The essential parameters for these damping properties are the ratio of the volume stiffness or stiffness per unit volume of the upper chamber wall 5 to the volume stiffness of the lower chamber wall 9, as well as the length and the diameter of the nozzle-shaped throttle 4.

In the case of low vibrations which generally occur at higher frequencies, in contrast to operation at high amplitudes, the elastic rubber membrane 15 bulges or buckles out, so that no fluid flows through the throttle 4 into the lower chamber 2. In this way, the hydraulic damping is neutralized or decoupled at low amplitudes, so that the acoustic behavior of the support is optimal due to the neutralizing of the hydraulic action.

This is especially important, because in motor vehicle carriages self-resonances generally occur at higher frequencies causing considerable noise problems. A neutralized motor mount according to the invention is able to eliminate a specific noise problem by tuning to minimum resonance. This tuning can essentially be influenced by the stiffness, diameter and volume stiffness parameters of the membrane 15, as well as by the counter pressure of the air chamber 16 which lies behind the membrane. In this way, this counter pressure can be varied within broad limits, by constructing the air chamber 16 so that it is either in communication with the outer atmosphere through a channel 17, by completely closing the air chamber 16 to the outer atmosphere, or in some cases by applying an increased pressure. The above-mentioned parameters can therefore be selected in such a manner that the amount of fluid which vibrates by bulging the neutralized membrane generates a resonant frequency which is tuned to a specific predetermined resonance. This resonant frequency corresponds to the following condition:

$$f_o \triangleq \sqrt{\frac{c}{m}}$$

wherein:

$c \triangleq$ the stiffness of the neutralizing membrane; and
$m \triangleq$ the vibrating fluid.

Figure 3:
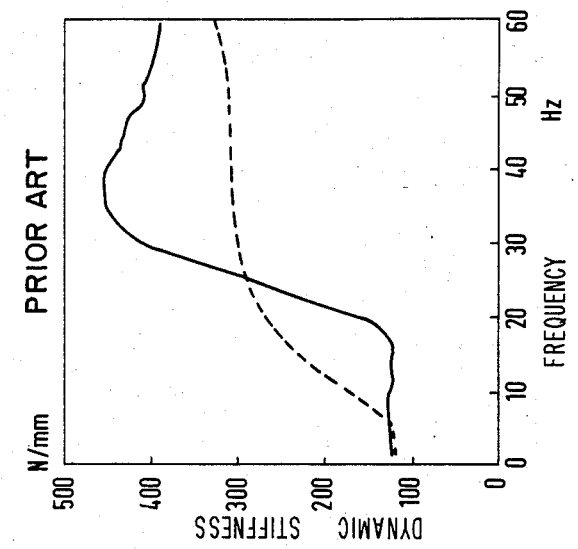
FIGS. 2 and 3 are diagrams showing the damping and the dynamic stiffness of conventional, non-neutralized hydraulic engine mounts.
Figure 2:
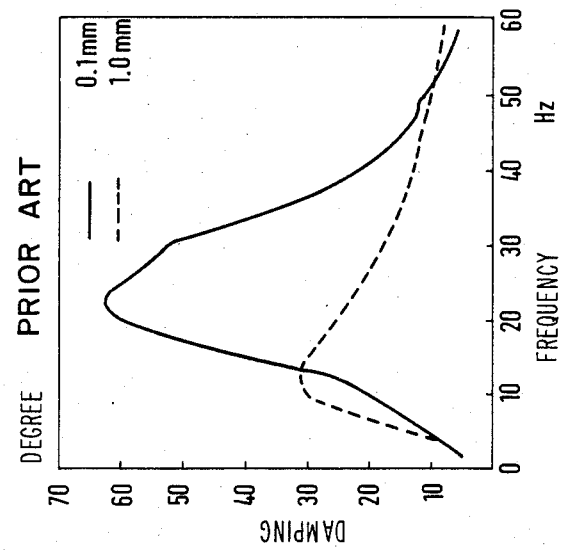
Figure 5:
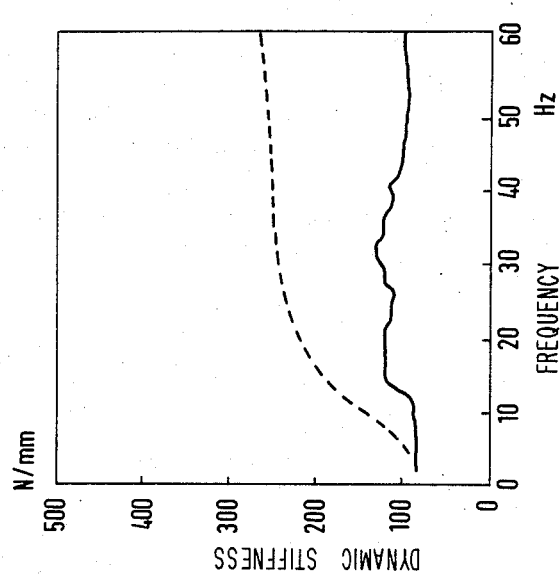
FIGS. 4 and 5 are corresponding diagrams for the damping and the dynamic stiffness of the neutralized hydraulic engine mounts according to the invention.
Figure 4:
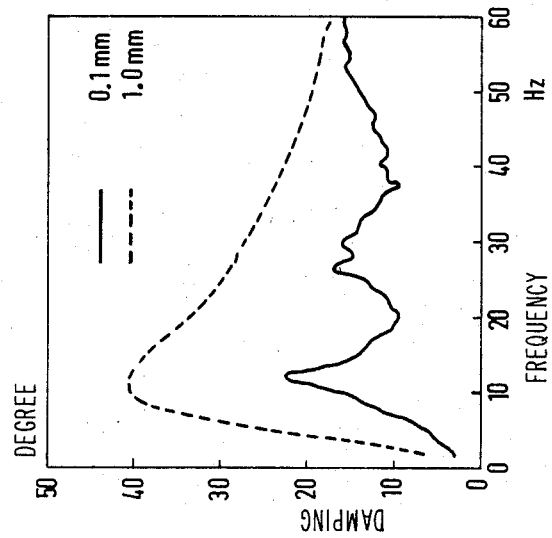

In the diagrams according to FIGS. 2 to 5, the damping behavior and the dynamic stiffness are shown with respect to the frequency, for a conventional, non-neutralized hydraulic mount, and for a neutralized hydraulic mount as set forth in the invention. FIG. 2 shows the damping plotted against the frequency, and FIG. 3 shows the dynamic stiffness plotted against the frequency. These graphs show that for a non-neutralized hydro-mount, increased damping occurs at decreased amplitude with an increase of the dynamic stiffness, though an opposite behavior would be desirable. In contrast to this, FIGS. 4 and 5 respectively show the behavior of the damping and the dynamic stiffness for a neutralized hydro-mount, illustrating that though the damping maximum remains the same, in this case good damping occurs at high amplitudes and low frequencies, and a good acoustic behavior is assured at low amplitudes and high frequencies. Accordingly, the damping decreases as the amplitude becomes smaller, and the stiffness also remains at small amplitudes at a static output level. FIG. 5 therefore shows especially clearly that the stiffness can be kept at a low level in a wide frequency range.

Summarizing, an engine mount is produced according to the invention, in which high vibration amplitudes of the motor are strongly damped, wherein the maximum damping can be tuned to the self-resonant frequency of the motor, and in the case of low amplitudes, the hydraulic damping is neutralized, so that an optimal acoustic behavior is obtained.

I claim:

1. Two-chamber engine mount with hydraulic damping, comprising a housing, an intermediate plate disposed in said housing dividing said housing into an upper chamber above said intermediate plate and a lower chamber below said intermediate plate, both of said chambers to be filled with fluid, said intermediate plate having a damping opening formed therein for fluid passage, an upper rubbery elastic peripheral wall at least partially defining said upper chamber, a lower cup-shaped rubbery elastic peripheral wall with a given hardness at least partially defining said lower chamber, an upper motor support plate disposed above said upper chamber, said upper support plate having a membrane chamber centrally formed therein to be filled with air, and an elastic rubbery membrane having a hardness greater than said given hardness of said lower peripheral wall, said rubbery membrane separating said membrane chamber from said upper chamber and being disposed in a plane extending through said upper rubbery elastic peripheral wall so that said membrane and said upper elastic peripheral wall are disposed in parallel operative relationship, and the diameter of said rubbery membrane being at most one-third the size of the largest diameter of said upper chamber.

2. Two-chamber engine mount according to claim 1, wherein said upper support plate has a ventilating hole formed therein providing communication between said membrane chamber and the surroundings.

3. Two-chamber engine mount according to claim 1, wherein said membrane chamber is closed off from the surroundings.

4. Two-chamber engine mount according to claim 1, wherein said given hardness of said lower wall is a Shore-A-hardness of substantially between 10 and 50

5. Two-chamber engine mount according to claim 1, wherein said given hardness of said lower wall is a Shore-A-hardness of substantially between 30 and 40.

* * * * *